March 9, 1965     A. N. WELLS     3,172,502

VIBRATION DAMPENER

Filed Jan. 6, 1964

INVENTOR
ARTHUR N. WELLS

BY *Shoemaker and Mattare*

ATTORNEYS 3,172,502
VIBRATION DAMPENER
Arthur N. Wells, Belmont, Calif., assignor to Apparatus Controls, San Carlos, Calif., a corporation of California
Filed Jan. 6, 1964, Ser. No. 335,764
7 Claims. (Cl. 188—1)

The present invention relates to a vibration dampener, and more particularly to a vibration dampener adapted for use with fluid conduits.

It is well recognized in the art that fluid conduits which conduct flowing fluids therethrough are subject to undesirable mechanical vibrations and noises, and owing to the tubular shape thereof, fluid conduits of this nature often carry mechanical vibrations and fluid noises for substantial distances. The noise emanating from such conduits may be simple mechanical vibrations produced by associated pumps and machinery, or the noises may be produced by fluids passing through the conduit means as such fluids are jetting through valves or whipping around elbows and other fittings connected in the conduit.

These vibrations often cause mechanical damage to the joints and fittings associated with the conduit, particularly where the conduit may terminate in a different type of structure such as a machine or the like. The damage in such instances usually consists of loosened threads, cracked weldments and cracked or weakened castings. This type of damage is often the direct result of the concentration of sonic energy at critical points where resonance occurs.

In addition to the mechanical damage, as discussed above, these undesirable vibrations may also adversely affect the fluids carried through the conduits. When fluids are mixed, or when they carry considerable impurities, such as petroleum, vibrations may cause a greater degree of emulsification and thickening than would be expected from normal turbulent flow. In order to maintain pumping economy and efficiency under these conditions, it is a common practice in the prior art to heat the conduit and the fluid therein to regain a desired degree of fluidity.

It is accordingly an important feature of the present invention to alter, absorb and reduce certain noises and vibrations, particularly higher pitched, or sibilant noises, occurring in conduits. The arrangement of the present invention provides a simple and effective apparatus which can be quickly and easily attached in operative position about a conduit.

The present invention employs a unique body means formed of a particular type of metallic material which serves to effectively obtain the desired results as set forth hereinabove. This body means is formed of a porous and resilient metallic substance having microscopic size openings and fine cracks therein to define a labyrinthine structure. This type of structure results in a very effective dampening action since the body means acts like a damped echo-chamber, the resiliency of the material of the body means serving to propagate the vibrations into a central portion of the body means where the resilient characteristics of the body means serving to propagate the sound energy well into the central portion of the body means where the sound energy is absorbed in a random fashion due to the labyrinthine structure hereof. It is accordingly apparent that the material of which the body means is constructed is an important and essential feature of the present invention which enables a novel vibration dampening effect to be obtained.

The body means includes a configuration which enables it to be readily clamped in operative position on a conduit and which of course also facilitates ready removal when required. The mass of the body means also preferably is related to the size of the conduit so as to obtain optimum efficiency of operation as hereinafter explained.

An object of the present invention is to provide a new and novel vibration dampener particularly adapted for use with fluid conducting conduits and adapted to alter, absorb and reduce certain noises and vibrations occurring in conduits, particularly high pitched or sibilant noises, thereby changing the vibration characteristics of such conduits and reducing the magnitude of the attendant noise.

Another object of the invention is the provision of the vibration dampener for use with fluid conduits which is adapted to substantially reduce mechanical damage to the conduits due to sonic energy therein.

A further object of the invention is to provide a vibration dampener for use with fluid conduits which is adapted to substantially reduce adverse effects on the fluid passing through the conduit as caused by noise and vibration to thereby for example reduce the degree of emulsification and thickening which may occur in the fluid.

Still another object of the invention is the provision of a vibration dampener which can be quickly and easily attached to and removed from its operative position relative to a conduit, and which further is quite simple and inexpensive in construction which is sturdy, durable and efficient in operation.

Other objects and many attendant advantages of the invention will become more apparent when considered in connection with the specification and accompanying drawings, wherein.

Figure 1:
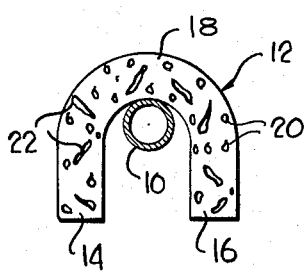
FIG. 1 is a somewhat schematic illustration for illustrating the general principles of the invention.

Referring now to the drawings wherein like reference characters designate corresponding parts throughout the several views, there is shown in FIG. 1 a body means indicated generally by reference numeral 12 which includes a pair of spaced leg portions 14 and 16 joined by an integral bight portion 12. This body means is disposed in operative position relative to a fluid conducting conduit 10 of conventional construction. It will be noted that the body means is so positioned relative to the conduit such that the conduit is disposed in abutting relation to the inner surface of the bight portion 18.

The body means of the present invention is preferably of a generally U-shaped configuration to thereby provide a spaced pair of legs which operate similar to the leaves of a tuning fork such that lateral vibrations of the centrally disposed conduit 10 tend to cause the leg portions 14 and 16 to vibrate slightly thereby causing the bight portion 18 to flex to a certain degree.

The body means 12 is formed of a metallic substance of a particular nature, this metallic substance being porous and resilient and of a generally spongy character. The body means has a labyrinthine structure, and as seen in FIG. 1, which illustrates in a schematic form a cross section of the body means, pores indicated by reference numeral 20 and elongated openings or cracks indicated by reference numeral 22 are illustrated as greatly exaggerated in size for the purpose of understanding. It should be understood that in actual practice, these pores are microscopic size openings and the cracks or elongated openings are very fine and of extremely small dimension.

Any lateral vibrations of the conduit 10 will cause corresponding vibrations of the two leg portions 14 and 16 which in turn cause flexure of the bight portion 18. The physical characteristics of the material of which the body means is formed converts this flexure of the bight portion into heat thereby absorbing the vibrations and sounds caused by lateral movement of the conduit means.

Any sound vibrations emanating from the conduit 10 which reach the body means 12 in any other manner, such as by radiation from the conduit, or by virtue of conduction through the point of physical contact between the conduit and the body means will be absorbed and dampened by the body means which effectively acts as a damped echo-chamber.

Suitable substances for use in the body means to provide the above described characteristics include sintered metals, sponge metals, and metals which exhibit fine cracks by virtue of embrittlement. The most effective alloy for the purposes of the present invention has been found to consist essentially of 88% by weight aluminum, 4% by weight copper and 8% by weight silicon. This alloy, after casting, is heated for a prolonged period at about 600° F. In time, the aluminum and silicon crystals contract and separate, leaving fine cracks between the crystals. The copper serves as a binder and toughener which conducts the sounds and vibrations into various areas of the body means until they are absorbed in the labyrinthine structure of the body means.

In order for the vibration dampener to be practical and effective, it must have sufficient weight, or in other words a certain amount of porous and resilient metallic material, in relation to the nature of the vibrations and the size of the conduit with which it is employed and the fluid mass carrying capacity of the conduit. The required weight of the body means increases with an increase in the cross sectional area of the conduit. A minimum weight of the body means in most instances is approximately ½ pound per square inch of the cross sectional area of the conduit. It is considered preferable, however, to employ about 1.3 pounds of weight of the body means per square inch of the cross sectional area of the conduit.

In other words, the weight of the body means in pounds should be approximately equal to the square of the conduit diameter measured in inches. For example, a 4-inch standard pipe has a 4.37 inch outside diameter and accordingly requires a body means having a weight of approximately 19 pounds.

Referring now to FIGS. 2 through 5 inclusive, a preferred modification of the invention is illustrated as disposed in operative relationship with respect to a fluid conducting conduit 30 of generally cylindrical configuration.

Figure 2:
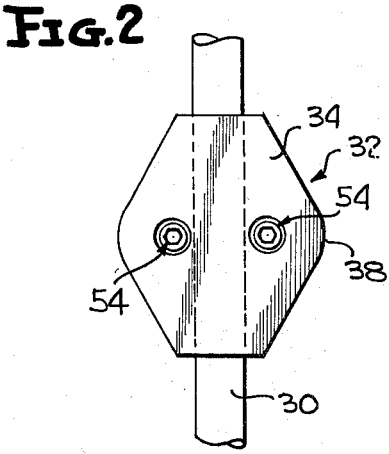
FIG. 2 is a top view of a preferred embodiment of the invention.

The vibration dampener body means is indicated generally by reference numeral 32 and includes a first or upper portion 34 and a second lower or clamping portion 36. The body portion 34 has a plan configuration as seen in FIG. 2 such that the body portion includes a central portion 38 of maximum width which tapers inwardly toward the opposite ends of the body portion.

Figure 5:
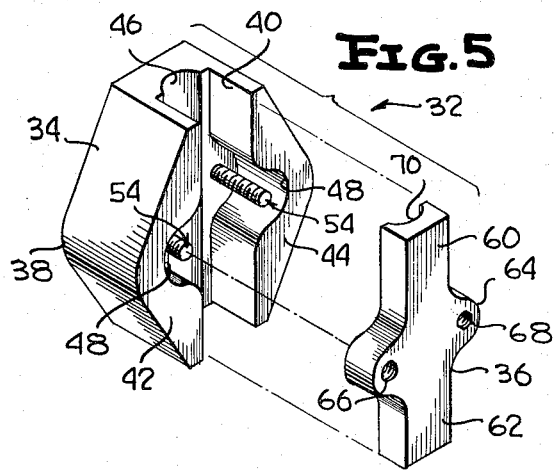
FIG. 5 is a top perspective exploded view of the vibration dampener of the present invention.

A recess portion 40 extends longitudinally of body portion 34 and is formed in the undersurface thereof as seen most clearly in FIG. 5. This central longitudinally extending recess portion defines a pair of spaced legs 42 and 44 whereby this body portion accordingly has a substantially U-shaped configuration such that it is adapted to operate in a manner similar to the U-shaped body means discussed in connection with FIG. 1.

Figure 4:
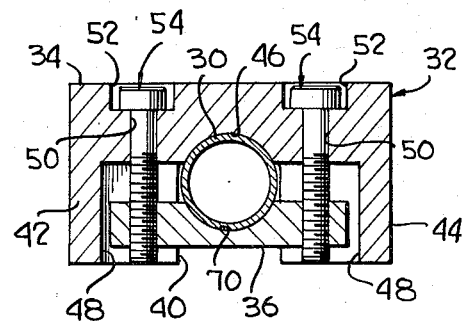
FIG. 4 is an enlarged sectional view taken substantially along line 4—4 of FIG. 3 looking in the direction of the arrows.

The upper wall of the recess portion 40 as seen in FIGS. 4 and 5 is of generally arcuate configuration and is adapted to fit snugly about the outer surface of the conduit 30.

The recess portion 40 is enlarged at opposite sides thereof in the central portion of the body means as indicated by reference numerals 48, these enlarged portions of the recess 40 being adapted to accommodate the cap screws 54 utilized for moving and holding the clamping portion of the body means in operative position as hereinafter explained.

A pair of bores 50 is provided through body portion 34, counterbores 52 being provided for receiving the enlarged upper ends of the cap screws 54 which extend downwardly through the bores 50. The clamping portion 36 of the body means includes two opposite end portions 60 and 62 which as seen in FIG. 3 fit between adjacent opposite ends of the leg portions 42 and 44 of body portion 34, portions 60 and 62 being spaced from such adjacent portions.

Figure 3:
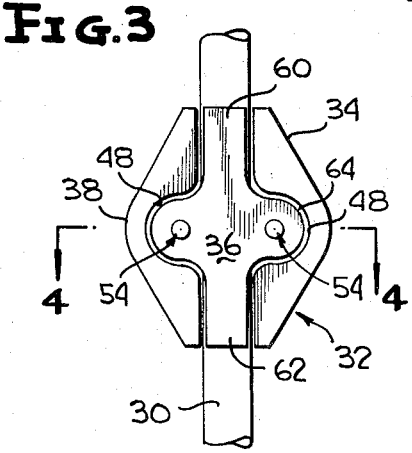
FIG. 3 is a bottom view of the apparatus illustrated in FIG. 2.

Clamping portion 36 also includes an enlarged central portion 64 which as seen in FIG. 3 is adapted to fit within the enlarged recess portions 48 and spaced therefrom whereby the clamping portion 36 when in operative clamped position is spaced all the way around the outer edge thereof from the adjacent surfaces of the body portion 34.

A pair of threaded holes 66 and 68 is provided in the enlarged portion 64 of the clamping portion, the lower ends of cap screws 54 being threaded into these openings 66 and 68 for moving and holding the clamping portion in its operative position as seen in FIG. 4.

The upper surface of the clamping portion as seen in FIG. 4 is indicated by reference character 70 and is of arcuate configuration so as to snugly fit about the outer surface of the conduit 30. It is apparent that when the clamping portion is in its operative position as seen in FIG. 4, the conduit 30 is clamped between the body portions 34 and 36 and accordingly the vibration dampener will be rigidly secured in its operative position in substantially surrounding relationship to the conduit.

It should be understood that the clamping portion 36 will generally be constructed of the same porous and resilient metallic substance as is employed in the larger main body portion 34. While a specific aluminum alloy has been described hereinbefore as the most effective known substance for the purpose of the present invention, it is also considered that any aluminum alloy will provide acceptable results for the intended purposes.

In practice, the vibration dampener of the present invention may be placed along a conduit every few thousand feet or at any appropriate position or spacing where there is evidence of excessive vibration or undesirable noise. When the vibration dampener is employed in conjunction with petroleum pipe lines for the purpose of the abatement of emulsification of the fluid, samples of the fluid may be obtained with and without the invention device secured in operative position on the pipe line to determine whether the emulsions have been caused by vibrations of the pipe line or for other reasons. It is, of course, generally desirable to keep mixed fluids free of emulsions since the viscosity is lower thereby reducing pumping costs.

The effect known as water hammer is not directly altered by utilization of the invention apparatus. However, in specific cases, there may be an indirect beneficial result. Water hammer occurs with relatively non-elastic fluids, such as water. Some water contains entrained gases, such as air or carbon dioxide, and when the impurities in the water are tightly emulsified thereby holding the entrained gases rigidly bound within masses of hard froth, the water is obviously non-elastic, and water hammer can prevail. If the emulsification of the gases can be loosened somewhat by changing the vibration characteristics of the conduit, then the elasticity of the gases becomes apparent in the water and the water hammer can be materially reduced in strength. One skilled in the art will inspect for a lowering of the temperature of the fluid in the conduit in question to determine whether the device has effected any decompression of the entrained gases that may be released from the tight binding emulsified matter.

It is apparent from the foregoing that there is provided according to the present invention a new and novel vibration dampener adapted to alter, absorb and reduce certain noises and vibrations occurring in fluid conduits. This vibration dampener is particularly adapted to eliminate high pitched or sibilant noises thereby altering the vibration characteristics of the associated conduit and reducing the magnitude of the attendant noise. Utilization of the vibration dampener of the present invention in conjunction with a fluid carrying conduit will substantially reduce mechanical damage to the conduit due to sonic energy and also will substantially reduce any adverse effects on the fluid flowing through the conduit such as the degree of emulsification and thickening. It is apparent that the apparatus can be quickly and easily attached in position on the conduit simply by employment of the cap screws for drawing up the clamping portion of the body means or releasing it with respect to the main body portion. The apparatus itself is quite simple and inexpensive in construction yet is sturdy, durable and efficient in operation.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. A vibration dampener for use with fluid conduits comprising a body means formed of a porous and resilient metallic material, said body means defining a pair of spaced leg portions connected by a bight portion such that a fluid conduit is adapted to fit between said leg portions, said body means including a clamping portion, and means for adjusting and securing said clamping portion in operative position relative to the remaining portion of the body means to clamp the body means in operative position relative to a fluid conduit.

2. A vibration dampener comprising a body means formed of a porous and resilient metallic material having a labyrinthine structure, said body means including a first portion having a substantially U-shaped cross sectional configuration and including an arcuate portion for engaging the outer surface of the fluid conduit, said body means including a clamping portion having an arcuate surface for engaging the outer surface of a fluid conduit, and means for securing and adjusting said clamping portion relative to said first portion to clamp a fluid conduit therebetween and to hold the body means in operative position about a fluid conduit.

3. Apparatus as defined in claim 2 wherein the material of said body means consists essentially of 88% aluminum by weight, 4% copper by weight and 8% silicon by weight.

4. A vibration dampener comprising a body means formed of porous and resilient metallic substance including microscopic size openings and fine cracks to define a labyrinthine structure, said body means including a first portion of substantially U-shaped cross sectional configuration and including an arcuate surface for engaging the outer surface of a fluid conduit, said first portion including a hollowed out portion, said body means including a clamping portion adapted to be disposed within said hollowed out portion, attaching and adjusting means connected between said first portion and said clamping portion for adjusting the position of a clamping portion relative to said first portion to permit clamping of a fluid conduit therebetween, said clamping portion including an arcuate surface for engaging the outer surface of a fluid conduit, said body means when in operative position being disposed in substantially surrounding relationship to a fluid conduit, said clamping portion being spaced from said first portion of the body means.

5. Apparatus as defined in claim 4 wherein said metallic material consists essentially of 88% by weight of aluminum, 4% by weight of copper and 8% by weight of silicon.

6. Apparatus as defined in claim 4 wherein the weight of the body means in pounds is approximately the square of the outer diameter of the associated fluid conduit in inches.

7. In combination, a substantially cylindrical fluid conduit adapted to conduct fluid therethrough, a vibration dampener operatively secured to said conduit and in substantially surrounding relationship thereto, said vibration dampener including a body means formed of a porous, resilient metallic substance of labyrinthine structure and including a major portion by weight of aluminum, said body means having a weight such that the number of pounds of weight equals substantially the square of the number of inches of the outer diameter of the associated fluid conduits, said body means including a first portion including a pair of spaced leg portions and an interconnecting bight portion, said bight portion including an arcuate surface in engagement with the outer surface of the fluid conduit, said leg portions including recess portions, said body means including a clamping portion, attaching members interconnected between said first body portion and said clamping portion for adjusting and securing the clamping portion in operative relationship, said clamping portion including an arcuate surface in engagement with the fluid conduit at a point approximately diametrically opposite to the part engaged by the arcuate surface formed on the first body portion, said clamping portion being spaced about the outer edge portions thereof from the adjacent portions of the first body portion.

References Cited by the Examiner

UNITED STATES PATENTS 1,610,208  12/26  McDonald _____ 188—1
1,657,390  1/28   Halikman _____ 188—1

ARTHUR L. LA POINT, *Primary Examiner.*

DUANE A. REGER, *Examiner.*